March 5, 1935. A. R. SCHERTZ 1,993,118
HYDRAULIC CLUTCH
Filed Nov. 18, 1933 4 Sheets-Sheet 1

Inventor
A. R. Schertz
By Clarence A. O'Brien
Attorney

March 5, 1935.　　A. R. SCHERTZ　　1,993,118
HYDRAULIC CLUTCH
Filed Nov. 18, 1933　　4 Sheets-Sheet 2
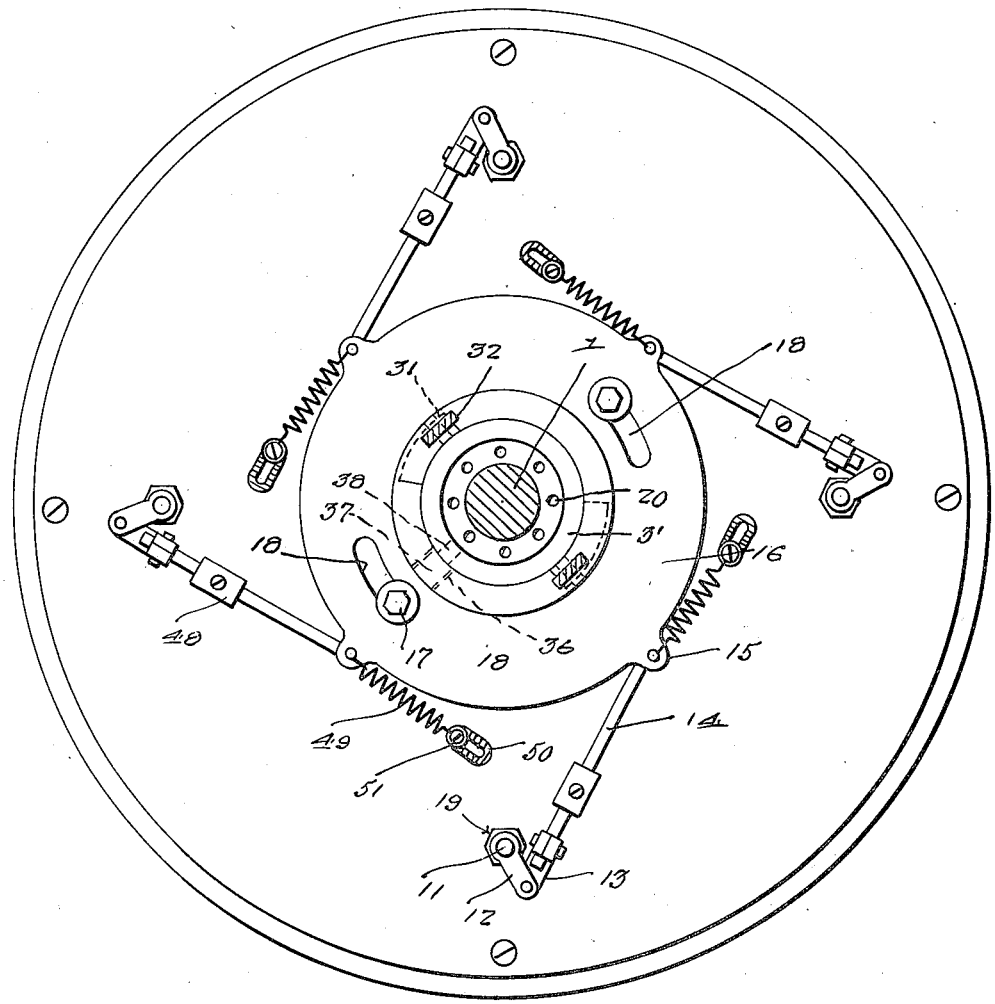
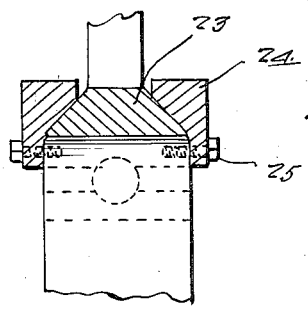
Inventor
A. R. Schertz
By Clarence A O'Brien
Attorney March 5, 1935.  A. R. SCHERTZ  1,993,118
HYDRAULIC CLUTCH
Filed Nov. 18, 1933  4 Sheets-Sheet 3
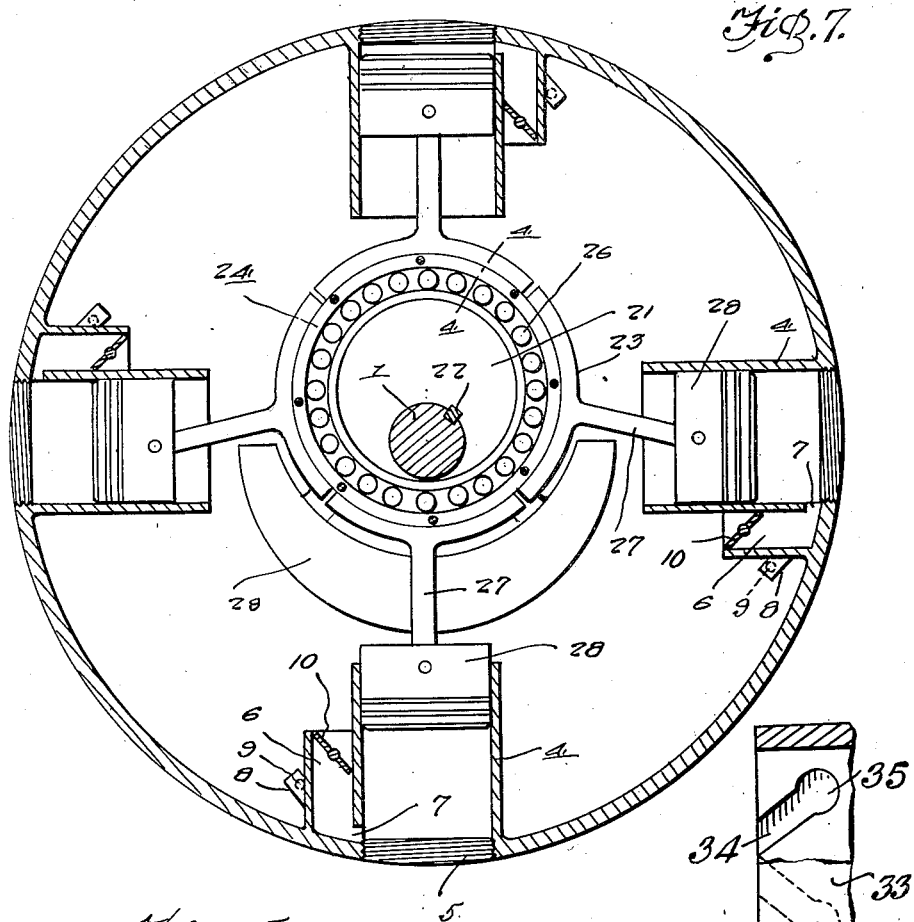
Inventor
A. R. Schertz
By Clarence A. O'Brien
Attorney March 5, 1935.

A. R. SCHERTZ 1,993,118

HYDRAULIC CLUTCH

Filed Nov. 18, 1933

Inventor

A. R. Schertz

By Clarence A. O'Brien
Attorney

Patented Mar. 5, 1935

1,993,118

UNITED STATES PATENT OFFICE 1,993,118

HYDRAULIC CLUTCH

Arthur Robert Schertz, McCracken, Kans.

Application November 18, 1933, Serial No. 698,693

5 Claims. (Cl. 192—60)

This invention relates to a hydraulic clutch, the general object of the invention being to provide a drive member and a driven member, with a casing attached to one of the members and containing fluid and having cylinders therein with an eccentric assembly on the other member having pistons attached thereto which operate in the cylinders, with valve means for controlling the flow of fluid from the cylinders.

Another object of the invention is to provide means whereby the clutch can be set to operate automatically when desired.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 2 is a rear view of the casing, with the driven shaft in section.

Figure 3 is a sectional view through the casing and the cylinders.

Figure 4 is a section on line 4—4 of Figure 3.

Figure 5 is a detailed sectional view showing how a roller engages a cam groove.

Figure 7 is a detail sectional view showing one of the check valves.

Figure 8 is a detail sectional view of the collar and showing the grooves and recesses therein.

Figure 1:
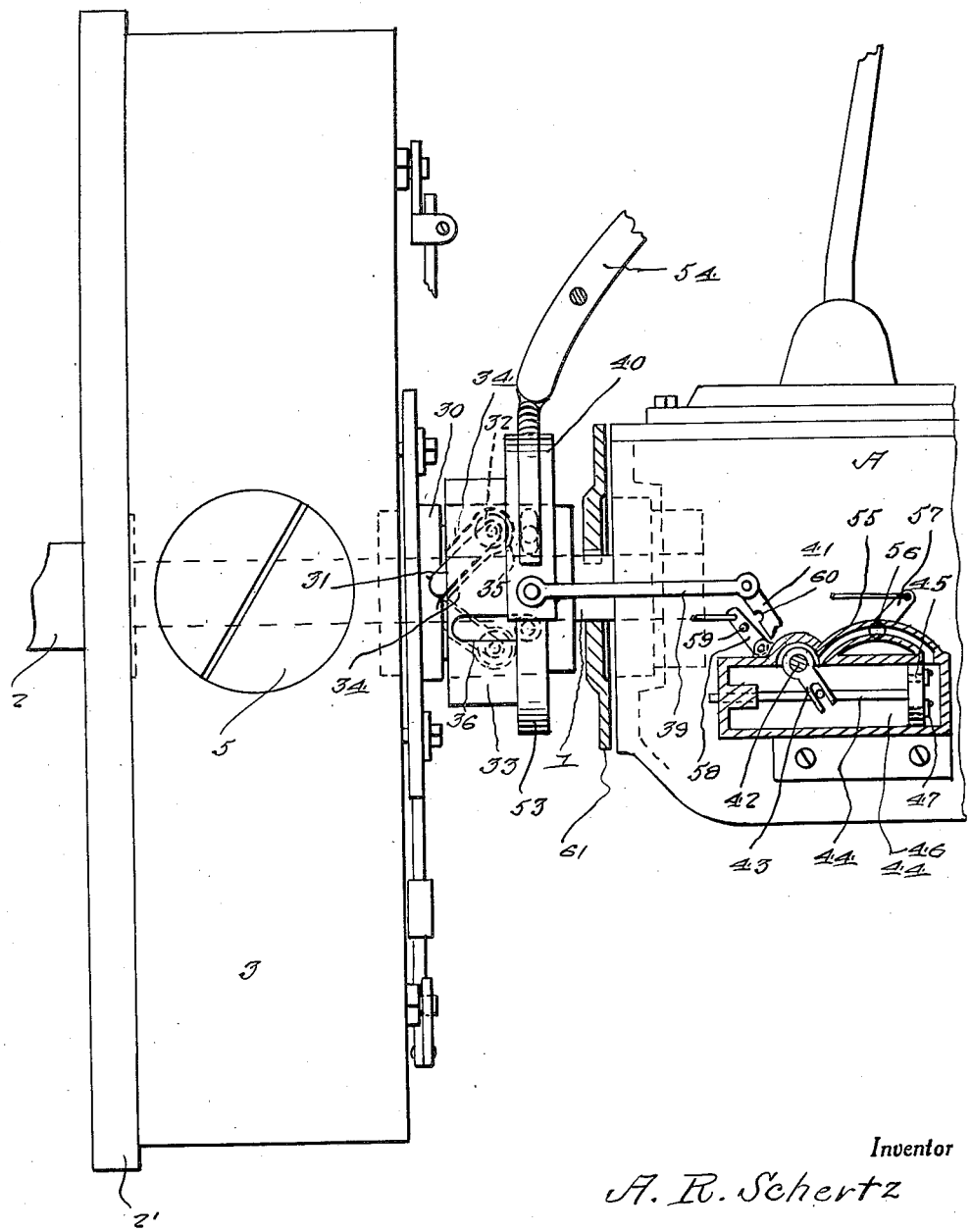
Figure 1 is a side view, with parts in section, showing the invention applied to a motor vehicle.
Figure 6:
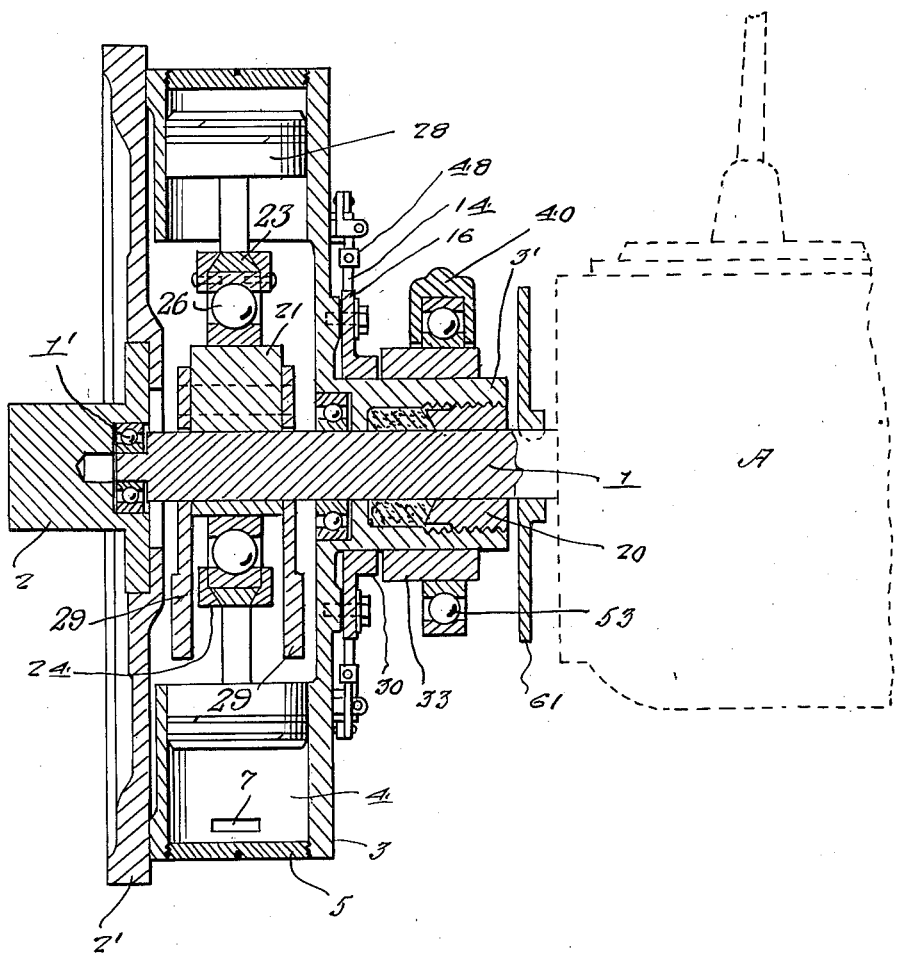
Figure 6 is a longitudinal sectional view through the invention.

In these drawings, the letter A indicates the transmission housing of the vehicle and the numeral 1 indicates the clutch shaft leading from the transmission. Numeral 2 indicates the crank shaft leading from the engine. A casing 3 is fastened to the fly wheel 2' which is connected to the shaft 2 and said casing is adapted to contain oil or the like and a plurality of radial cylinders 4 is arranged in the casing, the outer ends of the cylinders being closed by the plugs 5. A small chamber 6 is associated with each cylinder and a port 7 connects the outer end of each chamber with the outer end of each cylinder and a small port 8 connects each chamber with the casing and contains an outwardly closing check valve 9. The inner end of each chamber 6 is open, but is adapted to be closed by a valve 10. The stem 11 of each valve extends through the rear face of the casing, and an arm 12 is attached to the outer end of each stem. A clip 13 is pivoted to the outer end of each arm and a rod 14 is adjustably connected at one end to the clip and has its other end pivoted to an ear 15 on a disk 16 which is connected to the casing by means of the bolts 17 passing through the arcuate-shaped slots 18 in the disk. Thus the disk is supported from the casing for limited rotary movement. Each stem 11 passes through a packing gland 19 and suitable packing means 20 are provided for the shaft 1 where it enters the casing 3. The front end of this shaft 1 is suitably journaled in the front part of the casing, as shown at 1'.

An eccentric 21 is keyed to the shaft 1 within the casing, as shown at 22, and a sectional strap 23 surrounds the eccentric. The sections of the strap are held in place by the two rings 24 which are fastened to the outer race of bearings 26 by the screws 25, as shown in Figure 4. The antifriction bearings 26 are placed between the strap and the eccentric and each section of the strap is formed with a rod 27 which has its outer end pivoted to a piston 28 located in a cylinder 4.

Two counterbalances 29 are located in the casing and bolted to the eccentric for counterbalancing the same.

Thus it will be seen that when the valves 10 are closed, fluid is trapped in the cylinders so that the pistons cannot move outwardly and thus the shaft 1 is connected with the shaft 2, so that the shaft 1 is driven from the shaft 2. However, by opening the valves 10, the shaft 2 will rotate without imparting rotary movement to the shaft 1, and by partly closing the valves, the shaft 1 can be driven from the shaft 2 at a less speed than the speed of the shaft 2. The ports 8 will enable fluid to enter the cylinders when the valves 10 are closed so as to keep the cylinders full of fluid at all times.

A ring 30 is formed on the outer face of the disk 16 and two diagonally arranged arms 31 are fastened to the ring and have rollers 32 at their outer ends.

A collar 33 surrounds the casing sleeve 3' which carries the packing means 20, and has diagonally arranged or spiral slots 34 therein, each ending in a circular recess 35 for receiving a roller 32. A straight slot 36 is formed in the collar 33 and receives a roller 37 carried by a pin 38 supported in the sleeve 3' so that by moving this collar 33 toward the transmission A, the rollers 32 in the grooves 34 will cause a rotary movement of the disk 16 which will result in opening movement of the valves 10 through the rods 14 and the arms 12.

Anti-friction means 53 surround the collar or sleeve 33 and a yoke 40 fits over a portion of such means and is operated from the clutch pedal 54, as shown in Figure 1. A link 39 connects with the yoke or with a part of the pedal and with an arm 41 which is fastened to an end of a shaft 42 which carries a fork 43 for engaging a projection on a piston rod 44 of the piston 45 which operates in a fluid cylinder 46. The piston 45 has ports passing therethrough which are controlled by the rearwardly opening check valves 47 so that as the piston moves forwardly by the rear movement of the yoke in the de-clutching action, the fluid in the cylinder 46 in front of the piston can pass to the rear of the piston, but on the reverse movement of the piston, the fluid cannot pass through the ports.

The cylinder is provided with a by-pass 55 controlled by a valve 56 which is operated manually from any suitable point adjacent the operator by the means shown generally at 57.

This cylinder 46 and the parts associated therewith prevent the parts from being too rapidly moved and keeps the clutch mechanism from being engaged too quickly.

A lever 58 is pivoted to the cylinder and carries a pin 59 which, when the lever is manually swung rearwardly, will engage a notch 60 in the arm 41 and thus stop the arm from being entirely swung to its limit of movement forwardly and thus the arm and the parts attached thereto will limit forward movement of the collar 33 to prevent the rollers 32 from entering the recesses 35 at the inner ends of the grooves 34. Of course, when the lever 58 is in the position shown in Figure 1, the parts can be moved to a position where the rollers 32 will engage the recesses 35.

A weight 48 is connected to each rod 14 and a spring 49 connects each of the ears 15 of the disk 16 with a bolt 51 adjustably arranged in the slotted member 50 attached to the rear face of the casing 3 so that the tension of the springs 49 can be adjusted.

A plate 61 is keyed to the shaft 1 and when the sleeve or collar 33 is moved to de-clutching position, its rear end will engage the plate 61 so that these parts act as a brake to check the speed of the shaft 1 and thus the parts can be reengaged without shock or jar.

The drawings show the parts in the position they occupy when the valves 10 are closed and as will be seen from Figure 2, the springs 49 tend to move the disk 16 to open the valves, but this movement of the disk 16 is prevented by the rollers 32 on the arms 31 engaging the recesses 35 in the inner ends of the grooves 34.

When it is desired to release the shaft 1 from the drive shaft 2, the pedal 54 is depressed, which causes the yoke to shift the collar 33 rearwardly or toward the transmission A, and this movement will cause the arms 31 and the rollers 32 to partly rotate the disk 16 so that the rods 14 are moved inwardly and thus the valves 10 are opened or partly opened. During this de-clutching action, the piston 45 in the cylinder 46 will move forwardly, but there will be but little resistance to the movement of the parts by the fluid in the cylinder, as the fluid on one side of the piston will flow to the opposite side through the ports controlled by the valves 47. However, when the collar 33 is moved in an opposite direction by the pedal 54, the valves 47 in the piston 45 will close and thus check the movement of the piston 45 unless the by-pass valve 56 is open, for when this valve is open, the fluid will pass from one side of the piston through the by-pass to the other side. However, by properly adjusting this by-pass valve 56, the operator can regulate the return movement of the parts for engaging the shaft 1 with the drive shaft 2.

When the device is to be used as an automatic clutch or semi-automatic clutch, the operator swings the lever 58 rearwardly so that the pin 59, engaging in the notch 60 of the arm 41, will prevent the collar 33 moving forwardly a sufficient distance for the rollers 32 to enter the recesses 35. Then the springs 49 will move the disk 16 to a position to open the valves or partly open them, but by speeding up the engine, the weights 48 will swing outwardly by the centrifugal force and thus the valves 10 will be closed or partly closed, due to the weights 48 swinging the arms 14 to a position where the valves will be closed or partly so, so that the shaft 1 will be connected to the shaft 2. However, if the motor is overloaded or slows up, the springs 49 will tend to open the valves 10 again and thus the load on the motor will be reduced and as soon as it picks up, the weights 48 will again act on the disk 16 to close the valves or partly close them.

When the rollers are in the recesses 35, a light push on the clutch pedal will be necessary to force the rollers from the recesses so as to permit the rollers to move through the grooves 34.

It is thought from the foregoing description that the advantages and novel features of the invention will be readily apparent.

It is to be understood that changes may be made in the construction and in the combination and arrangement of the several parts, provided that such changes fall within the scope of the appended claims.

What is claimed is:—

1. A device of the class described comprising a driven shaft and a drive shaft, a casing connected to the drive shaft, an end of the driven shaft extending into the casing, an eccentric conected to said part of the driven shaft, radially arranged cylinders in the casing, a piston in each cylinder, an eccentric strap surrounding the eccentric and having rods connected therewith which are connected with the pistons, chambers leading from the outer ends of the cylinders into the casing, a valve in each chamber having a stem passing from the casing, a disk supported for rocking movement on the casing, rods pivoted to the disk and pivotally connected to the valve stems, a weight on each rod, manually operated means for adjusting the disk to adjust the valves, spring means tending to hold the disk in valve opening position, said weights acting to close the valves under centrifugal action, and manually operated means for preventing the manual adjusting means for the disk from interfering with the automatic operation by the weights and spring means.

2. A hydraulic clutch comprising a drive shaft and a driven shaft, a casing connected to the drive shaft and carrying a plurality of cylinders, a piston in each cylinder, means for connecting the pistons to the driven shaft, said casing containing fluid and each cylinder having a port placing the cylinder in communication with the casing, a valve controlling each port, a manually operated rotary member, rods connected with the valves and said member whereby turning movement of said member will operate said valves, spring means connected with said member for normally holding it in a position with the valves open, weights connected with the rods and acting to swing the rods outwardly to close the valves under centrifugal action, such action of the weight being controllable by the manually operated member.

3. A hydraulic clutch comprising a drive shaft and a driven shaft, a casing connected to the drive shaft and carrying a plurality of cylinders, a piston in each cylinder, means for connecting the pistons to the driven shaft, said casing containing fluid and each cylinder having a port placing the cylinder in communication with the casing, a valve controlling each port, a manually operated rotary member, rods connected with the valves and said member whereby turning movement of said member will operate said valves, spring means connected with said member for normally holding it in a position with the valves open, weights connected with the rods and acting to swing the rods outwardly to close the valves under centrifugal action, and manually operated means for holding the member in a position whereby the weights will automatically control the closing movements of the valves according to the speed of the drive shaft.

4. A device of the class described comprising a drive shaft and a driven shaft, a casing connected to the drive shaft, a plurality of radial cylinders carried by the casing and said casing containing fluid, a piston in each cylinder, means for connecting the pistons to the driven shaft, each cylinder having a port therein placing it in communication with the casing, a valve controlling each port, a disk supported for rocking movement on the casing, rods pivoted to the disk and pivotally connected to parts of the valves, spring means connected with the disk for normally holding the same in a position with the valves open, diagonal arms connected with the disk, a collar slidably arranged on the driven shaft and having diagonally arranged grooves therein for receiving the arms, each groove terminating rearwardly in a recess, a roller on each arm engaging the side walls of each groove and engaging the recess when the collar is in its forward position, and manually operated means for moving the collar.

5. A device of the class described comprising a drive shaft and a driven shaft, a casing connected to the drive shaft, a plurality of radial cylinders carried by the casing and said casing containing fluid, a piston in each cylinder, means for connecting the pistons to the driven shaft, each cylinder having a port therein placing it in communication with the casing, a valve controlling each port, a disk supported for rocking movement on the casing, rods pivoted to the disk and pivotally connected to parts of the valves, spring means connected with the disk for normally holding the same in a position with the valves open, diagonal arms connected with the disk, a collar slidably arranged on the driven shaft and having diagonally arranged grooves therein for receiving the arms, each groove terminating rearwardly in a recess, a roller on each arm engaging the side walls of each groove and engaging the recess when the collar is in its forward position, manually operated means for moving the collar, a weight on each rod, said weights acting to close the valves under centrifugal action when the collar is in a position with the rollers out of the recesses, and manually operated means for preventing movement of the collar to a position where the rollers will enter said recesses.

ARTHUR ROBERT SCHERTZ.